United States Patent

Moal

[15] 3,665,785
[45] May 30, 1972

[54] TRANSMISSION SHIFT LEVER HANDLE WITH AN ADJUSTABLE GRIP

[72] Inventor: Stephen W. Moal, 18953 Almond Road, Castro Valley, Calif. 94546

[22] Filed: June 1, 1970

[21] Appl. No.: 42,192

[52] U.S. Cl................................74/543, 16/121, 74/548
[51] Int. Cl. ...................................................G05g 1/10
[58] Field of Search.................74/543, 548, 473; 16/121; 299/347

[56] References Cited

UNITED STATES PATENTS 3,515,012  6/1970  Adahan.........................74/473
2,078,865  4/1937  MacLaury......................16/121

Primary Examiner—William F. O'Dea
Assistant Examiner—F. D. Shoemaker
Attorney—Ralph L. Mossino

[57] ABSTRACT

A transmission shift lever handle has a cylindrical grip member defining a gripping surface about an axis. A coupling joins the grip member at its mid portion to a floor mounted shift lever of a transmission to form a T-joint. The grip member is joined to the lever by the coupling to revolve about its gripping axis while the lever is moved between various shift stations.

12 Claims, 7 Drawing Figures

Patented May 30, 1972 3,665,785
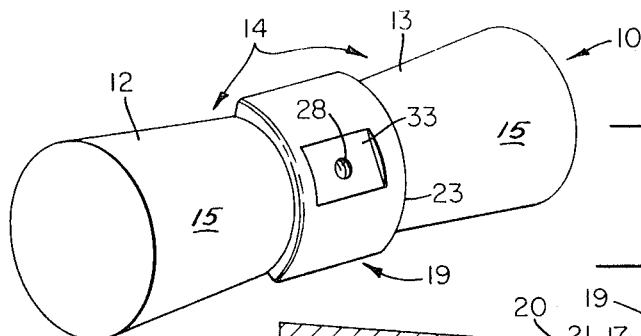
FIG_1
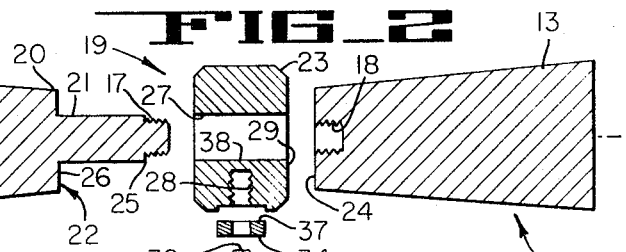
FIG_2
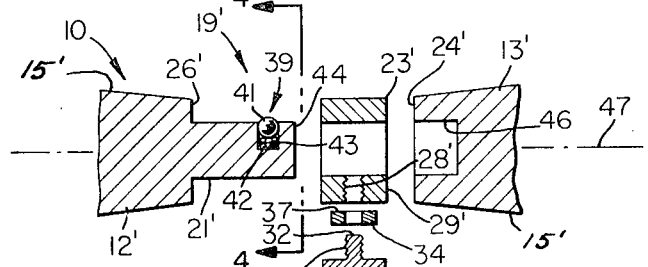
FIG_3
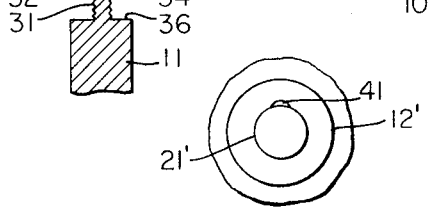
FIG_4
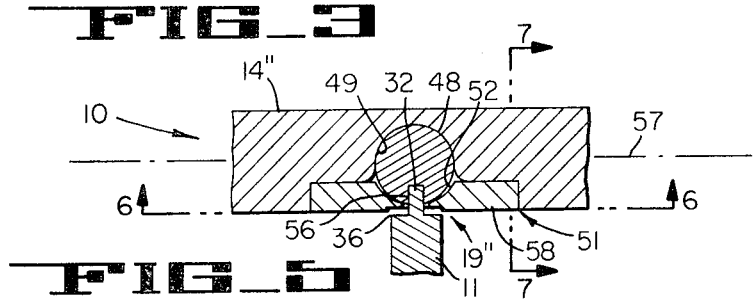
FIG_5
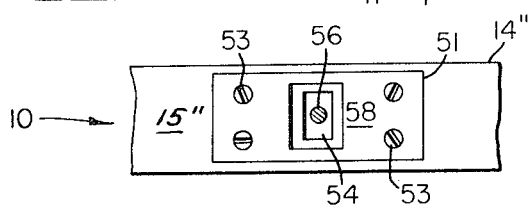
FIG_6
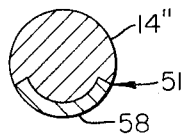
FIG_7
INVENTOR.
STEPHEN W. MOAL
BY
*Ralph L. Mossin*
AGENT ved between shift stations, the driver's hand gripping the
3,665,785

TRANSMISSION SHIFT LEVER HANDLE WITH AN ADJUSTABLE GRIP

FIELD OF INVENTION

The present invention relates to T-bar transmission shift lever handles for vehicles and, more particularly, to such handles having an adjustable grip.

BACKGROUND OF INVENTION

Auto racing is one of the most rapidly growing sports which, today, demands the use of superior auto equipment to be safely and successfully undertaken. Moreover, because of the high speeds encountered in modern auto racing, the quality of the equipment often determines the degree of success a contestant will achieve. This is particularly true in drag racing where the race is conducted over a short distance, usually, a quarter of a mile, at speeds often exceeding 150 miles per hour.

Because the distance of a drag race is short and the speeds attained during a race are high, the outcome of a drag race frequently is determined by the driver's gear shifting performance. In most drag racing vehicles or dragsters, the transmission shift lever extends from a shift console mounted to the dragster's floor and is moved forward and rearward of the vehicle when selecting gears. A driver's gear shifting performance largely depends upon how rapidly and precisely or smoothly he is able to shift gears, i.e., change the gear selection by moving the transmission shift lever between different shift stations. The rapidity and smoothness with which a driver is able to shift gears will depend upon the position of the shift lever relative to his hand and arm used in shifting gears. The more natural and comfortable the positions of the hand and arm during shifting, the more likely the desired gear shifting performance will be achieved. Even the slightest improvement in the gear shifting performance can reduce the elapsed time of a run of a race by hundredths and even tenths of a second. This can mean the difference between losing and winning a race since the difference between elapsed times of the winner and loser often is on the order of tenths or hundredths of seconds.

Considerable advantages is therefore to be gained by providing a gear shifting mechanism which facilitates the rapid and smooth shifting of gears. Additional advantages will be realized by the provision of a gear shifting mechanism which optimizes the leverage which the driver of an auto can apply to the transmission shift lever as it is moved between the various shift stations.

SUMMARY OF INVENTION

Accordingly, it is an object of this invention to facilitate moving the shift lever of an auto transmission during gear shifting operations.

More particularly, it is an object of this invention to facilitate rapid and smooth shifting of the gears of an auto transmission.

Another object of this invention is to enable the driver of an auto to keep his hand and arm in more natural and comfortable positions as he moves the transmission shift lever between shift stations.

Furthermore, it is an object of this invention to optimize the leverage which the driver of an auto can apply to the transmission shift lever as he moves it between the various shift stations.

Still, it is another object of this invention to enhance the driver's performance in shifting gears, particularly under auto racing conditions.

Yet another object of this invention is to provide a gear shift lever handle which facilitates rapid and smooth shifting of gears that can be used with standard transmission shift lever assemblies without modifying them.

These as well as other objects are realized by the transmission shift lever handle of the present invention. More specifically, the shift lever handle of the present invention has an adjustable grip which revolves to allow the driver's hand to move relative to the shift lever while remaining in a fixed grip position relative to the grip of the handle. The shift lever handle includes a grip member defining a gripping surface about an axis and a coupling for joining the grip member at its mid portion to a floor mounted shift lever of a transmission to form a T-joint. The coupling is joined to the grip member at its mid portion for relative movement therewith to allow the grip member to revolve about the axis. Hence, as the shift lever is moved between shift stations, the driver's hand gripping the handle can remain fixed relative to the grip member while moving relative to the moving shift lever. This enables the driver to keep his hand and arm in more natural and comfortable positions as he moves the shift lever while shifting gears. By maintaining his hand and arm in more natural and comfortable positions during gear shifting operations, the driver is able to apply more leverage to the shift lever and effect a more rapid and smooth shifting of the gears. As discussed hereinbefore, these factors lead to improved gear shifting performances and the aforementioned attendant advantages resulting therefrom.

BRIEF DESCRIPTION OF DRAWING

The foregoing objects and features of the present invention will become more apparent from the following description and claims considered together with the accompanying drawing of which:

FIG. 1 is a perspective view of one embodiment of the transmission shift lever handle of the present invention.

FIG. 2 is an exploded cross sectional view of the embodiment of FIG. 1.

FIG. 3 is an exploded cross sectional view of a portion of another embodiment of the transmission shift lever handle of the present invention.

FIG. 4 is an end view of a portion of the handle taken in the direction of line 4—4 of FIG. 3.

FIG. 5 is a cross sectional view of a portion of another embodiment of the transmission shift lever handle of the present invention.

FIG. 6 is a plan view of the partial embodiment of FIG. 5 taken in the direction of line 6—6.

FIG. 7 is an end cross sectional view of the partial embodiment of FIG. 5 taken in the direction of line 7—7.

DESCRIPTION OF PREFERRED EMBODIMENTS

Referring to FIGS. 1–7, inclusive, various embodiments of the transmission shift lever handle 10 of the present invention are illustrated. An embodiment which facilitates manufacturing the handle 10 and mounting it to a standard, generally, vertical extending floor mounted shift lever 11 of a transmission is illustrated in FIGS. 1 and 2. The shift lever handle 10 embodiment of FIGS. 1 and 2 includes a pair of axially aligned truncated conoidal handle ends 12 and 13 joined together to form an integral grip member 14 defining a gripping surface 15 about an axis 16. One of the handle ends 12 has a male threaded portion 17 for fastening to a mating female threaded portion 18 of the other conoidal handle end 13 to join the members together and form the integral grip member 14.

To allow the integral grip member 14 to revolve about the axis 16 during gear shifting operations, a coupling means 19 is provided for translating the reciprocating motion of the shift lever 11 to rotary motion. More specifically, the truncated end 20 of one of the conoidal handle ends 12 has a reduced diameter portion defining a journal 21. For ease of manufacturing, the handle end 12 having the male threaded portion 17 also defines the journal 21. The journal 21 extends from a shoulder portion 22 of the handle end 12 to the threaded portion 17. The male threaded portion 17 extends from a shoulder portion 25 of the journal towards the other handle end 13 for engaging the mating female threaded portion 18.

When assembled as illustrated in FIG. 1, the journal 21 of the handle 10 is carried by a cylindrical shell bearing 23 nested between for relative rotary movement with the facing surfaces 24 and 26 of the handle end 13 and the shoulder 22 of the handle end 12 respectively. To prevent tightening the handle ends 12 and 13 against the shell bearing 23 with sufficient force to hinder or prevent them and, hence, journal 21 from freely turning relative to the shell bearing 23, a journal shoulder 25 is provided. In the embodiment of FIGS. 1–2, the journal shoulder 25 is located at the end of the journal 21 to engage the facing surface 24 of the handle end 13 about the edge of the female threaded portion 18 and keep the handle ends 12 and 13 a certain distance apart by preventing the male threaded portion 19 from being advanced too far in the female portion 18. The journal shoulder 25 keeps the handle ends 12 and 13 separated a distance which is a few thousandths of an inch longer than axial length of the shell bearing 23. This assures the shell bearing 23 will not be bound between the handle ends 12 and 13 even though nested therebetween but, instead, assures the shell bearing 23 will allow the handle ends, hence, journal 21 to freely rotate relative to it.

The inner diameter of the shell bearing 23 defined by the cylindrical bearing surface 27 and the diameter of the journal 21 are selected to allow relative rotational movement therebetween while providing a snug fit. A diameter difference of 0.004 inch defining a clearance of 0.002 inch between the journal 21 and bearing surface 27 provides the desired fit. The shell bearing 23 allows the journal 21 to revolve therein about the axis 16 during gear shifting operations and together with the journal 21 form the coupling means 19.

To mount the handle 10 to the shift lever 11, the shell bearing 23 has a threaded portion 28 radially extending through a portion of the bearing wall 29. Preferably, the thread size is selected to mate with the male threaded portion 31 extending to define one end 32 of a standard floor mounted shift lever 11. With the handle 10 mounted to the shift lever 11 by its shell bearing 23, which is located in the mid portion of the handle 10, the handle 10 forms the desired T-form with the generally vertical extending shift lever 11. With the handle's coupling means 19 mounting the handle 10 to form a T-joint with the shift lever 11, the handle 10 can be subjected to the large forces characteristic of speed gear shifting operations without failing at the handle-shift lever joint. Hence, the driver of a vehicle employing the transmission shift lever handle 10 can apply increased leverage to the shift lever 11 during gear shifting operations. As previously discussed, this is particularly important in auto racing, especially, drag racing, where gear shifting operations are performed rapidly with an extreme amount of precision.

The particularly salient feature of the shift lever handle 10 of the present invention is its construction which allows its grip member 14 to revolve in a direction about the axis 16 surrounded by the gripping surface 15. During gear shifting operations, the shift lever 11 is advanced forward and rearward of the auto as it is moved between shift stations. Relative to FIG. 2, this corresponds to directions into and out of the sheet of drawing. Since the grip member 14 is able to revolve about the axis 16, the driver's hand gripping the handle 10 is able to move in a direction opposite the direction the shift lever 11 is moved and, therefore, to remain in a fixed grip position relative to the grip member 14 while moving relative to the moving shift lever 11. This allows the driver to keep his hand and arm in more natural and comfortable positions as he uses them to move the shift lever 11. As discussed hereinbefore, the driver is, thusly, able to apply more leverage to the shift lever 11 and thereby, improve his gear shifting performance.

To better fix the handle 10 to the shift lever 11, the shell bearing 23 is provided with a flat surface area 33 for seating the handle 10 on a supporting surface extending from the shift lever 11. In the embodiment of FIGS. 1 and 2, an adjustment nut 34 for positioning the handle 10 is interposed the shoulder 36 of the shift lever 11 and the surface area 33 of handle 10. The handle 10 is mounted to the shift lever 11 to seat on the confronting surface 37 of the adjustment nut 34. In the embodiment of FIGS. 5–7, the handle 10 resides on the shoulder 36 of the shift lever 11. Both the adjustment nut 34 and shift lever shoulder 36 have flat surfaces on which the flat surface area 33 of the handle 10 can be seated.

The adjustment nut 34 of the shift lever handle 10 serves two purposes. For example, in the embodiment of FIGS. 1–2, the adjustment nut 34 serves to lock the handle 10 in position relative to the shift lever 11. To facilitate gripping the handle 10, it is mounted to the shift lever 11 to be positioned to extend laterally of the longitudinal extent of the vehicle. The handle 10 is fixed in position on the shift lever 11 by locating it as desired and tightening the adjustment nut 34 against the surface area 33 of the handle. To assure the handle 10 remains fixed in the desired position, a jam nut type adjustment nut 34 is employed.

However, in a handle embodiment such as illustrated by FIGS. 3 and 4, the threaded portion 28' extends through the entire bearing wall 29'. To prevent the end 32 of the shift lever 11 from engaging the journal 21' of such embodiments, the adjustment nut 34 is positioned along the threaded portion 31 of the shift lever 11 so that when the shell bearing 23' seats on the confronting surface 37 of the adjustment nut 34, the threaded portion 31 of the shift lever 11 does not extend through the shell bearing wall 29' to engage the journal 21'. If the length of the threaded portion 31 of the shift lever 11 is made smaller than the thickness of the shell bearing wall or if, as in the embodiments illustrated by FIGS. 1–2, the end 38 of the threaded portion 28 proximate the journal 21 is closed, the adjustment nut 34 would not be necessary for this purpose. In an embodiment constructed according to FIGS. 1–2, the handle ends 12 and 13 has a maximum diameter of about 1 ½ inches. For strength, the diameter of the journal 21 is about one-half inch and thickness of the shell bearing wall 29 is about one-half inch. The threaded portion 31 of standard transmission shift levers has a length of about three-fourths inch. Hence, if the end 38 of the threaded portion 28 is not closed the longer threaded portion 31 of the shift lever 11 could extend through the narrower shell bearing wall 29 to contact the journal 21.

While an adjustment nut 34 has been described for locking the handle 10 in position relative to the shift lever 11, other common locking means may be employed. For example, a lock screw extending through the shell bearing wall 29 in its axial direction to engage the threaded portion 31 of the shift lever 11 can be employed to lock the handle 10 in position. However, the use of the aforedescribed jam nut 34 facilitates mounting the handle 10 to the shift lever 11 since the handle 10 can be assembled prior to mounting it to the shift lever 11.

An alternative manner of joining the handle ends or grip members 12' and 13' of the handle 10 is shown in the embodiment illustrated by FIGS. 3–4. Instead of joining the grip members 12' and 13' together with a threaded coupling means as in the embodiment of FIGS. 1–2, a spring bias detent 39 is employed. The spring bias detent includes a ball 41 and bias spring 42 carried in a recess 43 at the end 44 of an extended journal 21'. To receive and hold the extended portion of the journal 21', the grip member 13' is provided with a mating re-entrant cavity 46 of a radius slightly less than the distance the ball 41 extends from the axis 47 of the grip member 12'. The depth of the re-entrant cavity 46 is adjusted so the ends 24' and 26' of the handle ends 13' and 12', respectively, are maintained axial spaced apart a sufficient distance so as not to bind the shell bearing 23' and prevent relative rotary motion between the handle ends 12' and 13' and the shell bearing 23'. While only two ways of joining the grip members of handle 10 together have been disclosed in detail, it will be appreciated that other joining means may be employed to fasten the grip members together.

Another embodiment of the shift lever handle 10 of the present invention is illustrated by FIGS. 5–7. In this embodiment, a ball and socket coupling means 19'' is employed to translate the reciprocating motion of the shift lever 11 to rotary motion in the handle 10. More specifically, a ball 48 is joined as, for example, by threads or a press fitting to the end 32 of the shift lever 11. A single piece integral grip member 14'' defines a mating socket 49 at its mid portion for receiving the ball 48 for rotation therein. To hold the ball 48 within the socket 49, a retaining plate 51, also defining a mating socket portion 52 for receiving the ball 48, is secured to the grip member 14'' as by screws 53 to close the socket 49 with the ball 48 enclosed therein. A slot 54 extending in the circumferential direction of the handle 10 is provided in the plate 51 to allow a reduced diameter portion 56 of the shift lever 11 to pass therethrough and to limit the relative movement between the handle 10 and shift lever 11 when the lever is moved to only the direction resulting in the handle 10 revolving about the axis 57 surrounded by the gripping surface 15. To enhance the appearance of the handle embodiment illustrated by FIGS. 5-7, it is preferred to recess the retaining plate 51 in the grip member 14'' and curve its outer surface 58 to conform to the curvature of the grip member 14''.

It will be appreciated that other coupling means than those specifically described in detail could be employed to translate the desired revolving motion to the handle 10. For example, one obvious modification would be to form the journal 21 or 21' of the embodiments, such as illustrated by FIGS. 1-2 and 3-4, from two parts with both handle ends 12 and 13 carrying one of the parts. The handle ends 12 and 13 would be joined by providing, for example, mating male and female threaded portions at the confronting ends of the journal parts. Furthermore, if non-axially symmetric handle forms are constructed, for example, a pistol grip handle 10, the handle 10 may revolve about a line which does not lie precisely along the handle's principal axis. However, in such embodiments, the handle 10 would revolve about an axis extending in the direction of its principal axis and about which the gripping surface extends.

What I claim is:

1. A vehicle transmission shift lever handle with an adjustable grip comprising a grip member defining a gripping surface about an axis, and a coupling means for joining the grip member to a shift lever of a vehicle transmission to form a T-joint therewith, said coupling means joined to the grip member's mid portion for free relative movement therewith to allow the grip member to revolve an angular distance about said axis while the shift lever is moved to permit the operator's hand to remain in a fixed grip position relative to said gripping surface of the grip member while moving relative to the shift lever.

2. The shift lever handle according to claim 1 wherein the coupling means is joined to the grip member's mid portion to allow the grip member to revolve relative thereto in a direction opposite relative to the direction the shift lever is moved.

3. The shift lever handle according to claim 2 wherein the grip member includes first and second handle ends fastened together to form the grip member, each of said handle ends defining a gripping surface, the bearing seat is a journal at the mid portion of the fastened together handle ends, and the bearing member is a shell bearing in which the journal is received for relative rotary movement.

4. The shift lever handle according to claim 3 wherein the coupling means includes means for locating the grip member in a selected position transversely of the shift lever, and means for fastening the shell bearing to the shift lever to maintain the transverse grip member position relative to the shift lever.

5. The shift lever handle according to claim 3 wherein one of the handle ends is provided with the journal, the handle ends are fastened together at the extending end of the journal, the journal has a diameter less than the minimum width of the facing surfaces of the handle ends, and the shell bearing is nested between for relative rotary movement with the handle ends.

6. The shift lever handle according to claim 5 wherein the handle end provided with the journal is necked to define the journal as an integral part of the handle end.

7. The shift lever handle according to claim 5 wherein the means for fastening the shell bearing to the shift lever is a threaded portion in a wall of the shell bearing.

8. The shift lever handle according to claim 7 further including means for locating the grip member in a selected position transversely of the shift lever and maintaining the grip member position relative to the shift lever.

9. The shift lever handle according to claim 5 wherein the handle ends fastening means includes a male portion extending from the end of the journal and a mating female receiving portion defined by the other handle end without the journal.

10. The shift lever handle according to claim 9 wherein the journal defines a shoulder portion from which the male portion extends, the length of the journal between the handle end and journal shoulder slightly longer than the axial length of the shell bearing.

11. The shift lever handle according to claim 1 wherein the coupling means is a ball and socket coupler, the grip member defines the socket of the coupler, and the ball of the coupler has means for fastening it to the shift lever.

12. The shift lever handle according to claim 1 wherein the coupling means includes a rotary bearing having a bearing seat and a bearing member seated in said bearing seat for free relative rotary movement, said bearing member including fastening means for joining to the shift lever, and said bearing seat formed by the mid portion of the grip member so that the gripping surface of the grip member freely revolves about said axis while said bearing member and said bearing seat relatively rotate.

* * * * *